(12) United States Patent
Pelegri et al.

(10) Patent No.: US 7,629,793 B2
(45) Date of Patent: *Dec. 8, 2009

(54) CORRECTION OF MISALIGNMENT OF ANTENNAS IN A LOGGING TOOL

(75) Inventors: Luis M. Pelegri, Humble, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,609

(22) Filed: Oct. 31, 2007

(65) Prior Publication Data

US 2008/0074115 A1  Mar. 27, 2008

Related U.S. Application Data

(63) Continuation-in-part of application No. 11/340,785, filed on Jan. 26, 2006, now Pat. No. 7,319,331.

(51) Int. Cl.
*G01V 3/28* (2006.01)
(52) U.S. Cl. ....................................... 324/339
(58) Field of Classification Search ......... 324/338–339, 324/333–346, 369, 355–356; 702/6, 7, 11
See application file for complete search history.

(56) References Cited

U.S. PATENT DOCUMENTS

| | | | |
|---|---|---|---|
| 3,094,658 A | 6/1963 | Bravenec et al. |
| 3,124,742 A | 3/1964 | Schneider |
| 3,340,464 A | 9/1967 | Gouilloud |
| 3,808,520 A | 4/1974 | Runge |
| 3,890,563 A | 6/1975 | Dowling et al. |
| 3,996,518 A | 12/1976 | Halstead et al. |
| 4,302,722 A | 11/1981 | Gianzero |
| 4,367,647 A | 1/1983 | Barnoud et al. |
| 4,416,494 A | 11/1983 | Watkins et al. |
| 4,471,436 A | 9/1984 | Schaefer et al. |
| 4,514,693 A | 4/1985 | Meador |
| 4,651,101 A | 3/1987 | Barber et al. |
| 4,808,929 A | 2/1989 | Oldigs |
| 4,857,852 A | 8/1989 | Kleinberg et al. |

(Continued)

FOREIGN PATENT DOCUMENTS

EP  0289418 B1  9/1993

(Continued)

OTHER PUBLICATIONS

J.H. Moran & K.S. Kunz, Basic Theory of Induction Logging and Application to Study of Two-Coil Sondes, Geophysics, vol. 27, No. 6, Part 1, Dec. 1962, Society of Exploration Geophysicists pp. 829-858.

(Continued)

*Primary Examiner*—Reena Aurora
(74) *Attorney, Agent, or Firm*—Madan & Sriram, P.C.

(57) ABSTRACT

Misalignment of the transmitter and receiver antennas of an induction logging tool is determined by positioning the logging tool with a conducting loop magnetically coupled to the transmitter antenna and/or the receiver antenna, and activating the transmitter at a plurality of rotational angles.

17 Claims, 9 Drawing Sheets

U.S. PATENT DOCUMENTS

| | | |
|---|---|---|
| 4,983,912 A | 1/1991 | Roehrlein et al. |
| 5,065,099 A | 11/1991 | Sinclair et al. |
| 5,293,128 A | 3/1994 | Zhou |
| 5,343,001 A | 8/1994 | Cowles et al. |
| 5,452,761 A | 9/1995 | Beard et al. |
| 5,708,204 A | 1/1998 | Kasap |
| 5,781,436 A | 7/1998 | Forgang et al. |
| 5,789,995 A | 8/1998 | Minasi |
| 5,811,972 A | 9/1998 | Thompson et al. |
| 5,869,968 A | 2/1999 | Brooks et al. |
| 5,883,515 A | 3/1999 | Strack et al. |
| 5,999,883 A | 12/1999 | Gupta et al. ............ 702/7 |
| 6,064,210 A | 5/2000 | Sinclair |
| 6,150,954 A | 11/2000 | Smith |
| 6,311,045 B1 | 10/2001 | Domokos |
| 6,487,395 B1 | 11/2002 | Durec et al. |
| 6,586,939 B1 | 7/2003 | Fanini et al. ............ 324/339 |
| 6,734,675 B2 | 5/2004 | Fanini et al. ............ 324/339 |
| 2002/0101242 A1 | 8/2002 | Bittar |
| 2004/0046560 A1 | 3/2004 | Itskovich et al. |
| 2004/0056663 A1 | 3/2004 | Sinclair et al. |
| 2004/0113609 A1 | 6/2004 | Homan et al. |
| 2004/0140809 A1 | 7/2004 | Mercer |
| 2004/0217763 A1 | 11/2004 | Moore |
| 2005/0088180 A1 | 4/2005 | Flanagan |
| 2005/0143920 A1 | 6/2005 | Barber et al. |
| 2005/0256644 A1 | 11/2005 | Xiao |
| 2006/0043973 A1 | 3/2006 | Chen et al. |
| 2006/0103389 A1 | 5/2006 | Bespalov et al. |
| 2006/0135083 A1 | 6/2006 | Leinonen et al. |
| 2008/0054906 A1* | 3/2008 | Pelegri et al. ............ 324/339 |

FOREIGN PATENT DOCUMENTS

| | | |
|---|---|---|
| WO | WO 98/00733 | 1/1998 |

OTHER PUBLICATIONS

L.A. Tabarovskii & M.I. Epov, "Radial Characteristics of Induction Focusing Probes with Transverse Detectors in an Anisotropic Medium", Nauka, Soviet Geology and Geophysics, vol. 20, No. 7, 1979, pp. 81-90.

Wilt et al., "Electromagnetic Methods for Development and Production:State of the Art," The Leading Edge, Apr. 1998, pp. 487-491.

Zhou et al., "Reservoir Monitoring With Interwell Electromagnetic Imaging," Chevron Petroleum Technology Company, (date: unknown), pp. 1-10.

Zhou et al., A Review of Interwell Electromagentic Methods for Reservoir Characterization, (date: unknown), pp. 1-8.

Maher et al., "The Transverse Induction Logging Tool (TILT) Provides Enhanced Evaluation Results In The Cognac Field, Gulf of Mexico", May 1999, pp. 1-8.

\* cited by examiner

CORRECTION OF MISALIGNMENT OF ANTENNAS IN A LOGGING TOOL

CROSS REFERENCE TO RELATED APPLICATIONS

The present application is a continuation-in-part of U.S. patent application Ser. No. 11/340,785 filed on 26 Jan. 2006, now U.S. Pat. 7,319,331.

BACKGROUND OF THE INVENTION

1. Field of the Invention

The present invention is related to the field of apparatus design in the field of oil exploration. In particular, the present invention describes a method for calibrating multicomponent logging devices used for detecting the presence of oil in boreholes penetrating a geological formation.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations.

In general, when using a conventional induction logging tool with transmitters and receivers (induction coils) oriented only along the borehole axis, the hydrocarbon-bearing zones are difficult to detect when they occur in multi-layered or laminated reservoirs. These reservoirs usually consist of thin alternating layers of shale and sand and, oftentimes, the layers are so thin that due to the insufficient resolution of the conventional logging tool they cannot be detected individually. In this case the average conductivity of the formation is evaluated.

Conventional induction well logging techniques employ antennas wound on an insulating mandrel. One or more transmitter antennas are energized by an alternating current. The oscillating magnetic field produced by this arrangement results in the induction of currents in the formations which are nearly proportional to the conductivity of the formations. These currents, in turn, contribute to the voltage induced in one or more receiver antenna. By selecting only the voltage component which is in phase with the transmitter current, a signal is obtained that is approximately proportional to the formation conductivity. In conventional induction logging apparatus, the basic transmitter antenna and receiver antenna has axes which are aligned with the longitudinal axis of the well logging device. This arrangement tends to induce secondary current loops in the formations that are concentric with the vertically oriented transmitting and receiving antennas. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the bore hole, and the vertical resistivity in the direction parallel to the bore hole. Conventional induction logging devices, which tend to be sensitive only to the horizontal conductivity of the formations, do not provide a measure of vertical conductivity or of anisotropy.

In a transverse induction logging tools the response of transversal antenna arrays is also determined by an average conductivity, however, the relatively lower conductivity of hydrocarbon-bearing sand layers dominates in this estimation. In general, the volume of shale/sand in the formation can be determined from gamma-ray or nuclear well logging measurements. Then a combination of the conventional induction logging tool with transmitters and receivers oriented along the well axis and the transversal induction logging tool can be used for determining the conductivity of individual shale and sand layers.

One, if not the main, difficulties in interpreting the data acquired by a transversal induction logging tool is associated with vulnerability of its response to borehole conditions. Among these conditions is the presence of a conductive well fluid as well as wellbore fluid invasion effects In the induction logging instruments the acquired data quality depends on the formation electromagnetic parameter distribution (conductivity) in which the tool induction receivers operate. Thus, in the ideal case, the logging tool measures magnetic signals induced by eddy currents flowing in the formation. Variations in the magnitude and phase of the eddy currents occurring in response to variations in the formation conductivity are reflected as respective variations in the output voltage of receivers. In the conventional induction instruments these receiver induction antenna voltages are conditioned and then processed using analog phase sensitive detectors or digitized by digital to analog converters and then processed with signal processing algorithms. The processing allows for determining both receiver voltage amplitude and phase with respect to the induction transmitter current or magnetic field waveform.

There are a few hardware margins and software limitations that impact a conventional transversal induction logging tool performance and result in errors appearing in the acquired data.

The general problems encountered are discussed in U.S. Pat. No. 6,734,675 and U.S. Pat. No. 6,586,939 to Fanini et al., both having the same assignee as the present application and the contents of which are incorporated herein by reference. Fanini '939 discloses a transverse induction logging tool having a transmitter and receiver for downhole sampling of formation properties, the tool having a symmetrical shielded split-coil transmitter antenna and a bucking coil interposed between the split transmitter coils to reduce coupling of the transmitter time varying magnetic field into the receiver. The tool provides symmetrical shielding of the coils and grounding at either the transmitter or receiver end only to reduce coupling of induced currents into the received signal. The tool provides an insulator between receiver electronics and the conductive receiver housing having contact with conductive wellbore fluid, to reduce parasitic current flowing in a loop formed by the upper housing, feed through pipe, lower housing and wellbore fluid adjacent the probe housing or mandrel. An internal verification loop is provided to track changes in transmitter current in the real and quadrature component of the received data signal.

Fanini '675 discloses a transverse induction logging tool having a transmitter and receiver for downhole sampling of formation properties, the tool having a symmetrical shielded split-coil transmitter antenna and a bucking coil interposed between the split transmitter coils to reduce coupling of the transmitter time varying magnetic field into the receiver. The tool provides symmetrical shielding of the coils and grounding at either the transmitter or receiver end only to reduce coupling of induced currents into the received signal. The tool provides an insulator between receiver electronics and the conductive receiver housing having contact with conductive wellbore fluid, to reduce parasitic current flowing in a loop formed by the upper housing, feed through pipe, lower housing and wellbore fluid adjacent the probe housing or mandrel. An internal verification loop is provided to track changes in transmitter current in the real and quadrature component of the received data signal.

SUMMARY OF THE INVENTION

One embodiment of the invention is an apparatus for evaluating an induction logging tool for use in a borehole. The logging tool includes a current source which activates a transmitter antenna on the logging tool and a receiver antenna spaced apart axially from the transmitter antenna wherein the receiver antenna produces a signal in response to the activation of the transmitter coil. The apparatus includes at least one conducting loop which magnetically coupled to the transmitter antenna and/or the receiver antenna. The signal produced by the receiver coil is indicative of a misalignment between the transmitter antenna and the receiver antenna. A single conducting loop may encompass both the transmitter antenna and the receiver antenna. Two electrically connected conducting loops may be used with one of the loops encompassing the transmitter antenna and the other loop encompassing the receiver antenna. The transmitter antenna may have an axis substantially parallel to or substantially orthogonal to a longitudinal axis of the logging tool. The receiver antenna may have an axis substantially parallel to or substantially orthogonal to a longitudinal axis of the logging tool. The apparatus may further include a support which rotates the logging tool through a plurality of angles with the transmitter being activated at each of the angles, and a processor which estimates from the signals at each of the rotational angles the angle of misalignment. The misalignment angle may be estimated based on a rotational angle at which the signal is substantially zero.

Another embodiment of the invention is a method of evaluating an induction logging tool for use in a borehole. A transmitter antenna on the tool is activated. A signal is provided using a receiver antenna in response to the activation of the transmitter antenna. Magnetic coupling is provided between a conducting loop and the transmitter antenna and/or receiver antenna. From the signal, a misalignment angle between the transmitter coil and the receiver coil. The method includes using at least one conducting loop for axially encompassing the transmitter antenna and/or the receiver antenna. The encompassing may be done by using a single conducting loop. The encompassing may be done by using a first loop for encompassing the transmitter antenna and a second loop for encompassing the receiver antenna. The transmitter antenna may have an axis that is substantially parallel to or orthogonal to a longitudinal axis of the tool. The receiver antenna may have an axis that is substantially parallel to or orthogonal to a longitudinal axis of the tool. The logging tool may be rotated through a plurality of angles with the transmitter being activated at each of the angles, and the misalignment angle may be estimated from the signals at each of the angles. The misalignment angle may be estimated from an angle at which the signal is substantially zero.

BRIEF DESCRIPTION OF THE DRAWINGS

The present invention is best understood with reference to the accompanying figures in which like numerals refer to like elements and in which.

DETAILED DESCRIPTION OF THE INVENTION

The instrument structure provided by the present invention enables increased stability and accuracy in an induction wellbore logging tool and its operational capabilities, which, in turn, results in better quality and utility of wellbore data acquired during logging. The features of the present invention are applicable to improve the structure of a majority of known induction tools.

Figure 1:
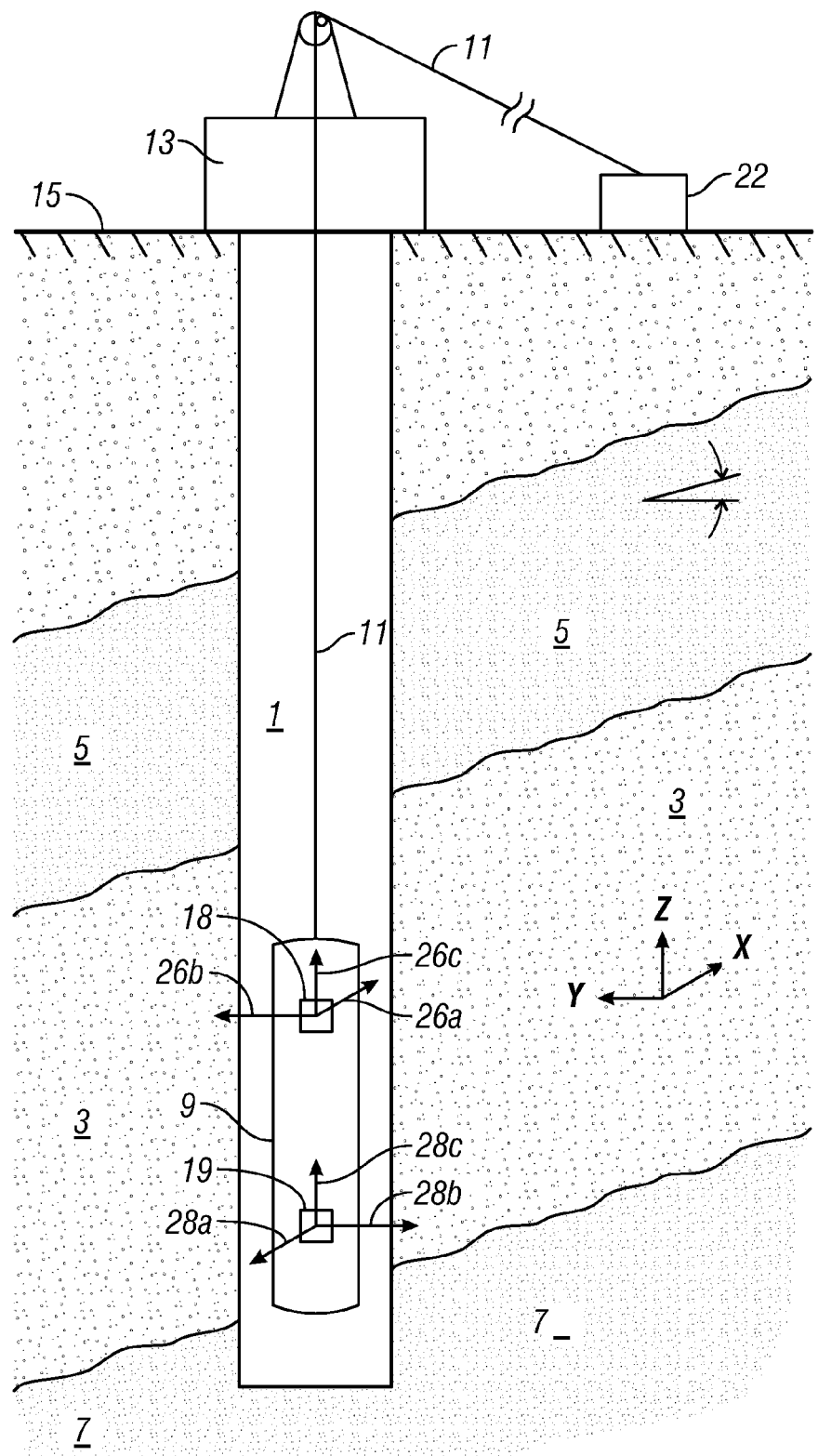
FIG. 1 (prior art) shows schematically a wellbore extending into a laminated earth formation, into which wellbore an induction logging tool as used according to the invention has been lowered.

The invention will now be described in more detail and by way of example with reference to the accompanying drawings. FIG. 1 schematically shows a wellbore 1 extending into a laminated earth formation, into which wellbore an induction logging tool as used according to the present invention has been lowered. The wellbore in FIG. 1 extends into an earth formation which includes a hydrocarbon-bearing sand layer 3 located between an upper shale layer 5 and a higher conductivity than the hydrocarbon bearing sand layer 3. An induction logging tool 9 used in the practice of the invention has been lowered into the wellbore 1 via a wire line 11 extending through a blowout preventor 13 (shown schematically) located at the earth surface 15. The surface equipment 22 includes an electric power supply to provide electric power to the set of coils 18 and a signal processor to receive and process electric signals from the receiver coils 19. Alternatively, the power supply and/or signal processors are located in the logging tool.

The relative orientation of the wellbore 1 and the logging tool 9 with respect to the layers 3, 5, 7 is determined by two angles, one of which θ as shown in the FIG. 1. For determination of these angles see, for example, U.S. Pat. No. 5,999,883 to Gupta, et al. The logging tool 9 is provided with a set of transmitter coils 18 and a set of receiver coils 19, each set of coils 18, 19 being connected to surface equipment 22 via suitable conductors (not shown) extending along the wire line 11.

Each set of coils 18 and 19 includes three coils (not shown), which are arranged such that the set has three magnetic dipole moments in mutually orthogonal directions, that is, in x, y and z directions. The three-coil transmitter coil set transmits $T_x$, $T_y$ and $T_z$. The receiver coil receives $R_x$, $R_y$ and $R_z$ plus the cross components, $R_{xy}$, $R_{xz}$ and $R_{zy}$. Thus, coil set 18 has magnetic dipole moments 26a, 26b, 26c, and coil set 19 has magnetic dipole moments 28a, 28b, 28c. In one embodiment the transmitter coil set 18 is electrically isolated from the receiver coil set 19. In an alternative embodiment, each coil in transmitter coil set 18 electrically isolated from each other and each coil in receiver coil set 19 electrically isolated from each other. The coils with magnetic dipole moments 26a and 28a are transverse coils, that is they are oriented so that the magnetic dipole moments are oriented perpendicular to the wellbore axis, whereby the direction of magnetic dipole moment 28a is opposite to the direction of magnetic dipole moment 26a. Furthermore the sets of coils 18 and 19 are positioned substantially along the longitudinal axis of the logging tool 9.

Figure 2:
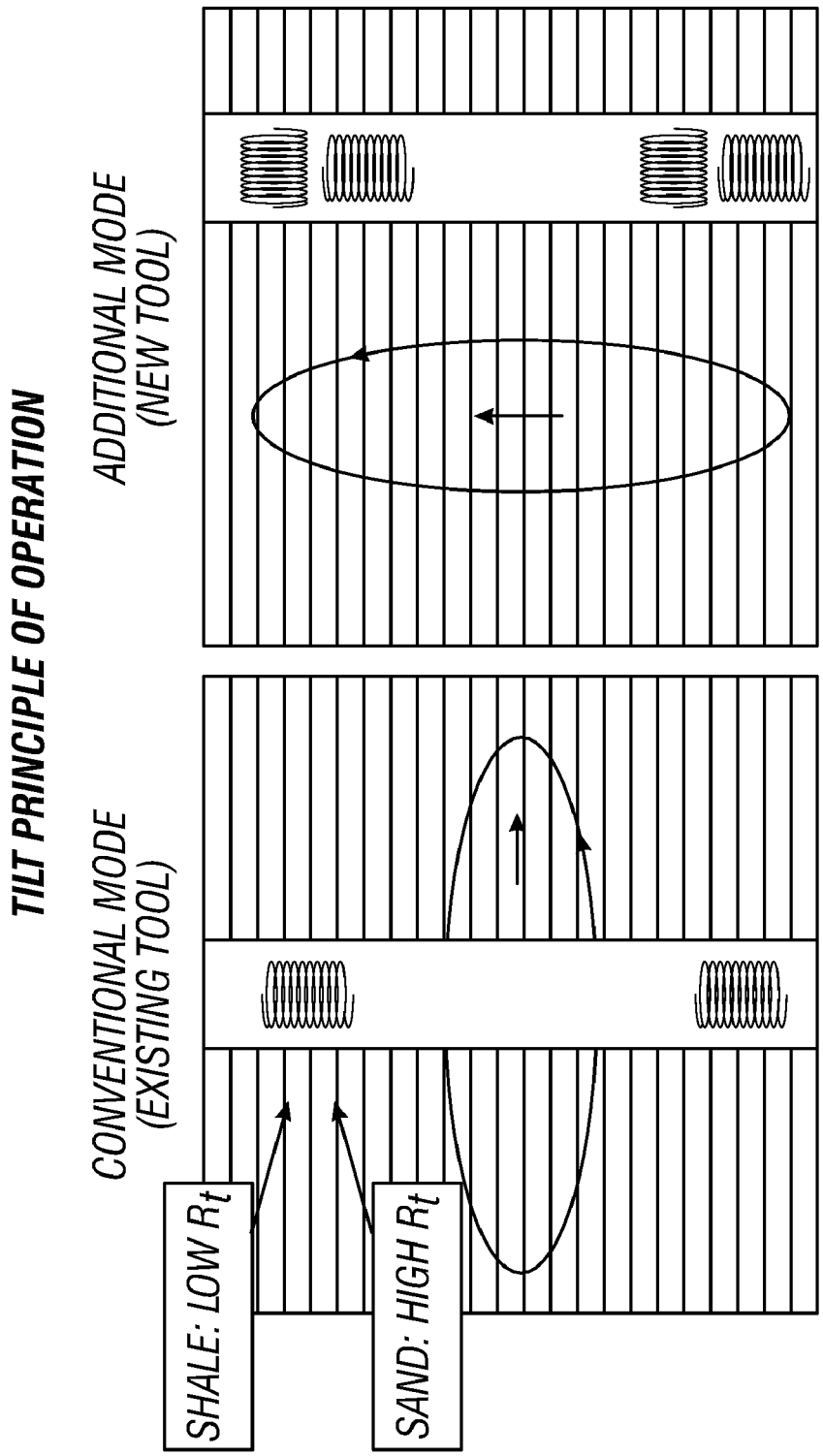
FIG. 2A (prior art) illustrates a conventional resistivity measurement in the vertical direction.
FIG. 2B (prior art) illustrates a resistivity measurement in the horizontal direction.

As shown in FIG. 2A, conventional induction logging tools provide a single transmitter and receiver coil that measure resistivity in the horizontal direction. In the conventional horizontal mode, as shown in FIG. 2A, the resistivities of adjacent high resistivity sand and low resistivity shale layers appear in parallel, thus the resistivity measurement is dominated by low resistivity shale. As shown in FIGS. 1 and 2B, in the present invention a transverse coil is added to measure resistivity in the vertical direction. In the vertical direction, the resistivity of the highly resistive sand and low resistivity shale are appear in series and thus the vertical series resistivity measurement is dominated by the resistivity of the highly resistive sand.

For ease of reference, normal operation of the tool 9, as shown in FIGS. 1 and 2B, will be described hereinafter only for the coils having dipole moments in the x-direction, i.e. dipole moments 26a and 28a. During normal operation an alternating current of a frequency $f_1$ is supplied by the electric power supply of surface equipment 22 to transmitter coil set 18 so that a magnetic field with magnetic dipole moment 26a is induced in the formation. In an alternative embodiment, the frequency is swept through a range $f_1$ through $f_2$. This magnetic field extends into the sand layer 3 and induces a number of local eddy currents in the sand layer 3. The magnitude of the local eddy currents is dependent upon their location relative to the transmitter coil set 18, the conductivity of the earth formation at each location, and the frequency at which the transmitter coil set 18 is operating. In principle the local eddy currents act as a source inducing new currents, which again induce further new currents, and so on. The currents induced into the sand layer 3 induces a response magnetic field in the formation, which is not in phase with the transmitted magnetic field, but which induces a response current in receiver coil set 19. The magnitude of the current induced in the sand layer 3 depends on the conductivity of the sand layer 3, the magnitude of the response current in receiver coil set 19. The magnitude also depends on the conductivity and thereby provides an indication of the conductivity of the sand layer 3. However, the magnetic field generated by transmitter coil set 18 not only extends into sand layer 3, but also in the wellbore fluid and in the shale layers 5 and 7 so that currents in the wellbore fluid and the shale layers 5 and 7 are induced.

Figure 3:
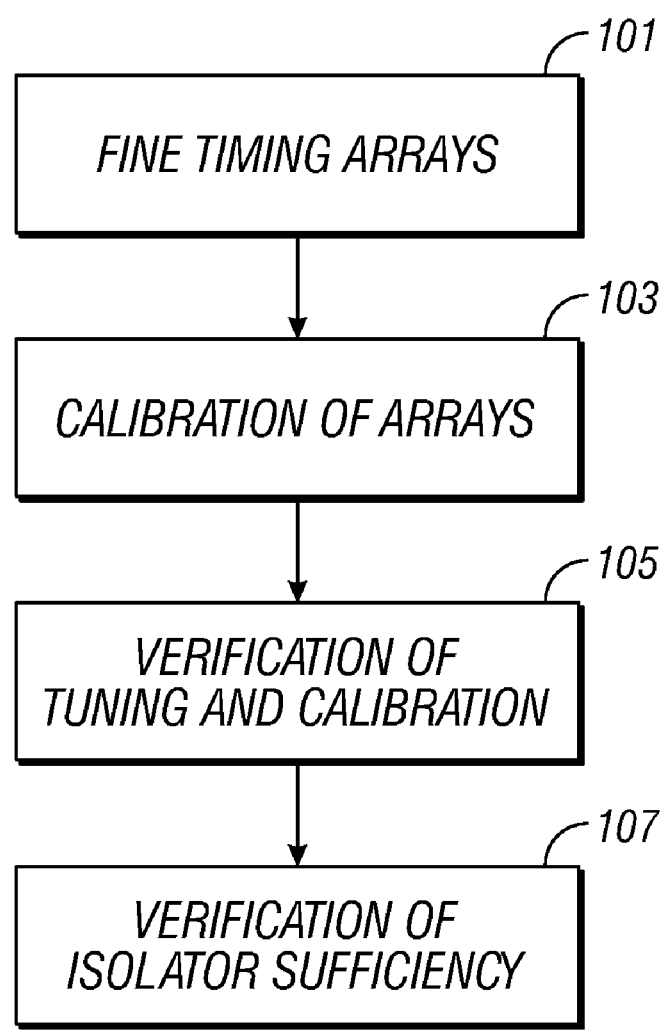
FIG. 3 is an overall flow chart of the procedures of the present invention.

The overall procedures of the present invention used to ensure proper functioning of a deployed multicomponent induction logging tool is summarized in FIG. 3. Calibration of the instrument's arrays is done, particularly estimating its transfer coefficient 101. Subsequently, a final verification of the tuning and calibration consistency is performed 103.

Figure 4:
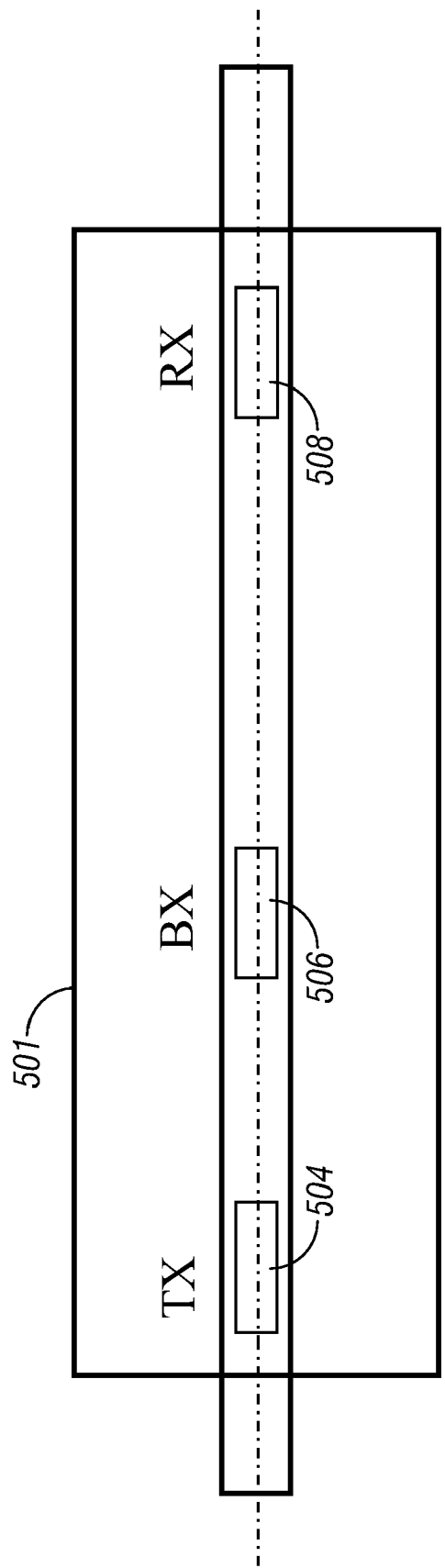
FIG. 4 illustrates an assembly for calibrating of transverse arrays in a logging tool.

Turning now to FIG. 4, one arrangement of the alignment loop is discussed. Shown therein is an alignment loop 501 surrounding an array characterized by the transmitter antenna 504 directed along an X direction ($T_x$) and the receiver antenna 508 directed along the X direction ($R_x$). Bucking coil $B_x$ 506 is also shown. This array is denoted as XX, using a nomenclature in which the first letter signifies the orientation direction of the transmitter antenna and the last letter signifies the orientation direction of the receiver antenna. This nomenclature is generally used herein. The XX and YY arrays in the multi-component tool are ideally aligned at 90° from each other. When this alignment is not met, the response of the cross components (XY,YX) are affected by part of the reading of the related main component. The alignment measuring method of the present invention is based on analyzing the output of the cross-component system when the tool is rotated inside of an alignment loop. The alignment loop is magnetically coupled to the transmitter antenna and the receiver antenna.

The alignment loop 501 is a stationary loop, lying so that the longitudinal axis of the loop and the longitudinal axis of the well-logging tool are substantially aligned. Its dimensions are such as to obtain substantial inductive coupling with the transmitter as well as with the receiver of both XX and YY arrays. An important aspect of the present invention is that no portion of either the transmitter or the receiver coil extends beyond the loop. This is in contrast to prior art devices in which this condition is not satisfied. When this condition is not satisfied, the resulting calibration is sensitive to the position of the calibration loop relative to the transmitter and receiver antennas, and is hence suspect. The arrangement shown in FIG. 5 uses a single calibration loop where this condition is satisfied. The single calibration loop axially encompasses the transmitter coil and the receiver coil. A detailed analysis of the signals is given later in this document. The logging tool is supported within the alignment loop by suitable support (not shown) that has the capability of rotating the logging tool about its axis through known angles.

Figure 5:
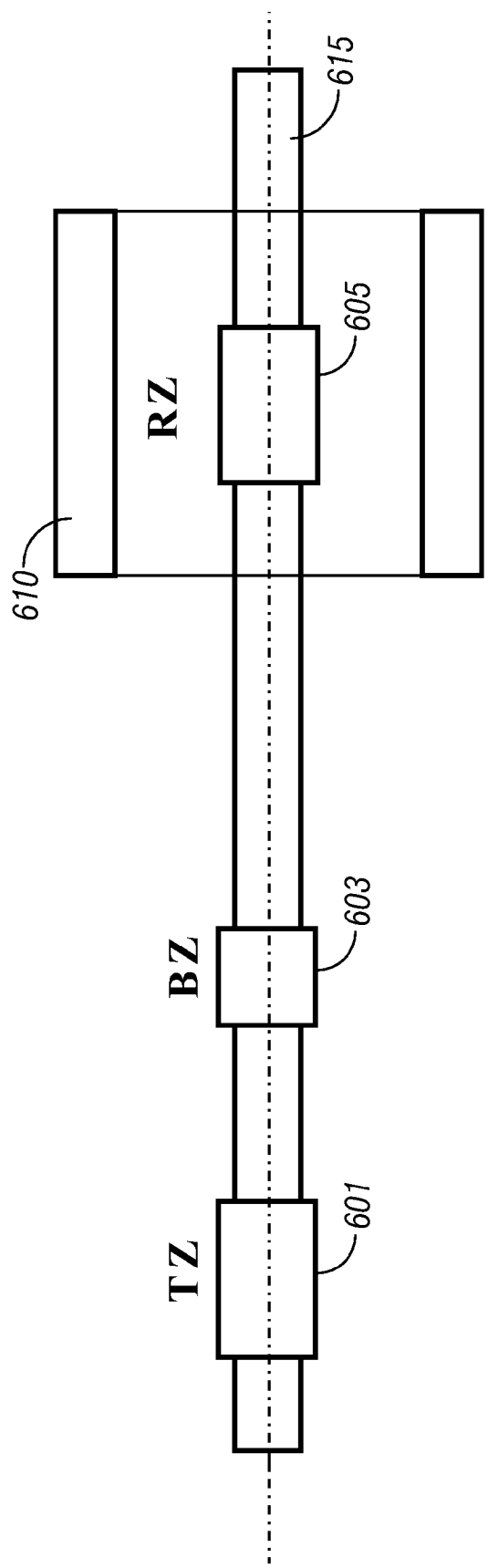
FIG. 5 illustrates an assembly for calibrating longitudinal arrays in a logging tool.

FIG. 5 illustrates a loop alignment assembly usable for aligning ZZ arrays in a testing device. Transmitter TZ 601, bucking coil BZ 603 and receiver RZ 605 are disposed along the feed-through pipe 615 and have a common longitudinal axis. Alignment loop 610 is substantially coaxial with receiver RZ 605 and substantially centered on RZ. As with the arrangement of FIG. 5, the receiver coil is axially encompassed by d the calibration loop 610.

Figure 6:
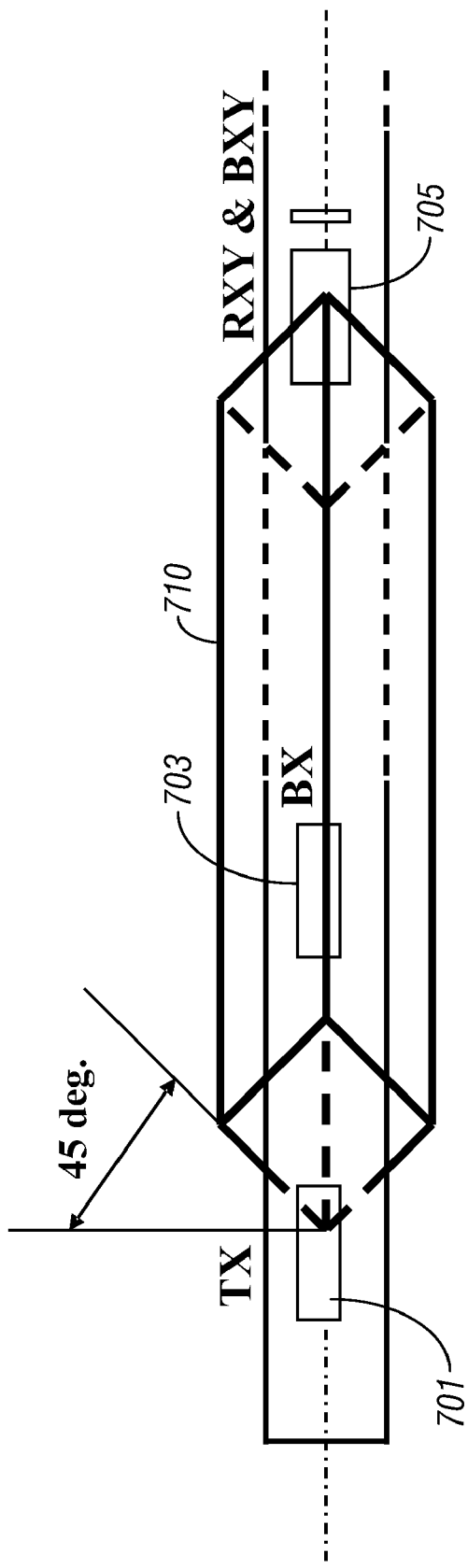
FIGS. 6-7 illustrate assemblies for calibrating XY cross-component arrays.

Cross component array calibration is discussed next. FIG. 6 illustrates an embodiment for calibration of an XY array using a calibration box. This functions in the same manner as a calibration loop, and may be considered to be one. Transmitter 701 and bucking coil 703 are disposed along the feed-through pipe oriented to produce a magnetic moment in an X-direction. Receiver 705 is disposed along the same feed-through pipe having an orientation so as to receive components of a magnetic moment in a is disposed along the same feed-through pipe having an orientation so as to receive components of a magnetic moment in Y-direction. The alignment loop 710 is disposed at an angle of 45° so as to be oriented halfway between the X-direction and the Y-direction. To simplify the illustration, the box has been depicted without showing it as extending beyond the transmitter and receiver coils.

Figure 7:
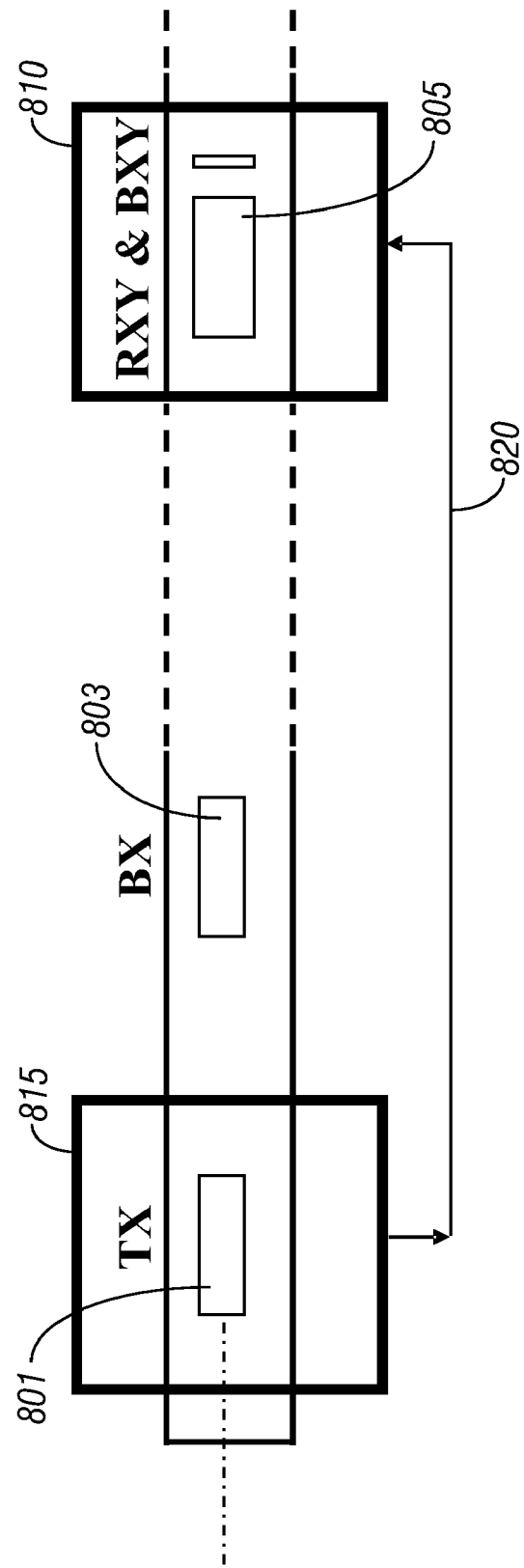

Those skilled in the art would recognize that the alignment loop shown in FIGS. 4 and 6 would be bulky and possible difficult to manage under field conditions. An embodiment of the present invention that addresses this problem is discussed next. FIG. 7 illustrated an alternate embodiment for aligning an XY array. Alignment loop 815 is located at the TX 801, and alignment loop 810 is positioned at the RXY cross-component receiver 805. Both alignment loops are oriented along the same direction as their respective transmitter/receiver. A wire 820 electrically couples alignment loop 810 and alignment loop 815. The individual loops 810 and 815 are easier to handle than a single large box, and by use of the electrical connection 820, are functionally equivalent to box 501 of FIG. 4. In the configuration of FIG. 7, the loop 815 axially encompasses the transmitter coil 801 and the loop 810 axially encompasses the receiver coil.

Figure 8:
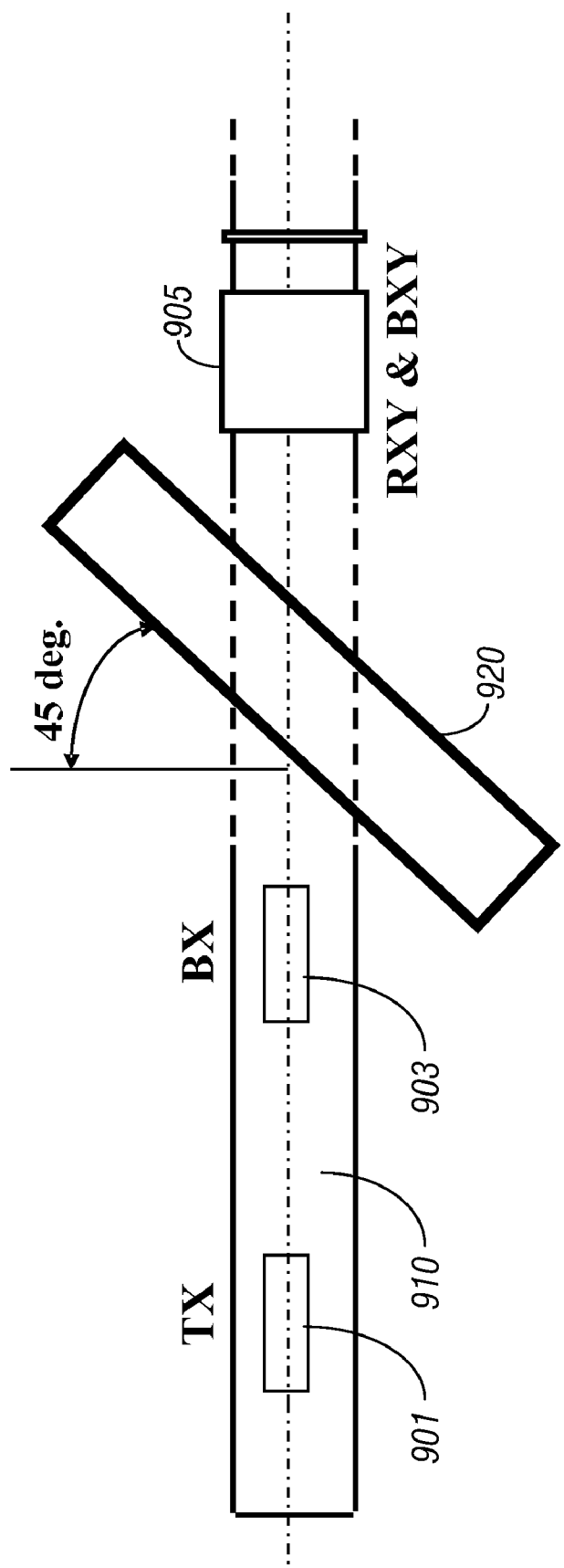
FIGS. 8-9 illustrate assemblies for calibrating XZ cross-component arrays.

FIG. 8 illustrates an assembly for orienting of the XZ cross-component array. Transmitter TX 901 and bucking coil BX 903 are disposed along the feed-through pipe oriented so as to produce a magnetic moment along an X-direction. The receiver RZ 905 is disposed along the feed-through pipe and oriented so as to be receptive to Z-components of magnetic moments. The alignment loop 920 can be positioned centrally between main X-transmitter 901 and Z-cross-component receiver 905 and tilted 45° with respect to the tool longitudinal axis 910. The assembly of FIG. 8 displays small signals during XZ array calibration. This signal tends to display a high sensitivity to the angle.

Figure 9:
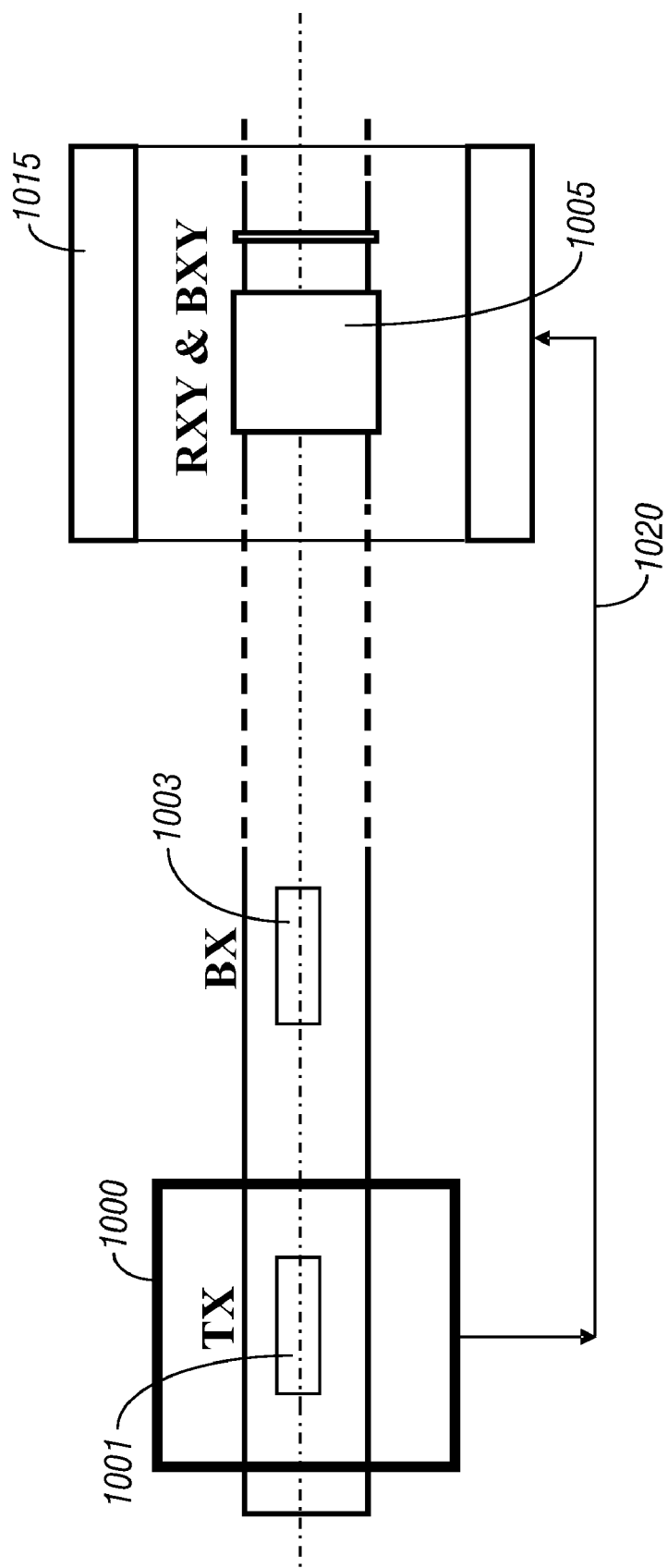

FIG. 9 illustrates an alternate embodiment for aligning the XZ cross-component array. As in the apparatus shown in FIG. 7, two loops are used. Transmitter TX 1001 and bucking coil BX 1003 are disposed along the feed-through pipe oriented so as to produce a magnetic moment along an X-direction. The receiver RZ 1005 is disposed along the feed-through pipe and oriented so as to be receptive to Z-components of magnetic moments. Alignment loop 1010 is centered on transmitter TX 1001, and alignment loop 1015 is coaxial with receiver RZ 1005. A wire 1020 electrically couples alignment loop 1010 and alignment loop 1015. In contrast to the assembly of FIG. 8, calibration using two alignment devices displays a large signal for the XZ array calibration.

We next discuss in detail the use of the alignment loop for establishing the coil orientation. When examining a cross-component array, the XY or YX response obtained by rotating the tool inside of the alignment loop has a zero-crossing each time that either a transmitter or a receiver coil is perpendicular to the plane of the loop. Whichever coil (transmitter or receiver) is substantially aligned with the loop (enclosed in the same plane) experiences a maximum coupling with the alignment loop. When the position of the aligned coil is varied around the point of alignment with the alignment loop, the coupling response between them undergoes a slow change corresponding to the variation. The non-aligned coil experiences a minimum coupling with the alignment loop. When the position of the non-aligned coil is varied around this point of minimal coupling, the coupling experiences an abrupt change. The coupling becomes zero when the non-aligned coil achieves perpendicularity with the alignment loop. A practitioner in the art would recognize that the zero-crossings of the coupling response are significantly affected by the coil that is at right angle to the alignment loop, regardless of whether the perpendicular coil is a receiver or a transmitter. The substantially aligned coil plays little or no role in the production of a zero-crossing. The angle between successive zero crossings thereby represents an alignment angle between the two related coils.

Mathematically, the inductive coupling between two coils resembles a cosine function of the angle between them. Thus, the coupling response system of coils made by an aligned system of cross components and an alignment loop is given by the following expression:

$$R(\phi) = K \cdot \cos(\phi) \cdot \cos\left(\phi - \frac{\pi}{2}\right). \quad (1)$$

Applying trigonometric identities, Eq. (1) can be simplified to $$R(\phi) = K \cdot \cos(\phi) \cdot \sin(\phi), \quad (2)$$

and since $$\sin(\phi) \cdot \cos(\phi) = \frac{1}{2}\sin(2 \cdot \phi), \quad (3)$$

it follows that $$R(\phi) = K \cdot \frac{1}{2} \cdot \sin(2 \cdot \phi). \quad (4)$$

Eqn. (4) illustrates that there are two cycles of variation for each cycle of tool rotation.

By considering a misalignment angle $\beta$ between transmitter and receiver, the response function can now be expressed as $$R(\phi, \beta) = K \cdot \cos(\phi) \cdot \cos\left(\phi - \frac{\pi}{2} + \beta\right), \quad (5)$$

where each cosine function characterizes the response of the individual cross component coils. It is easy to see that $$R(\phi, \beta) = 0, \quad (6)$$

when $$\phi = n \cdot \frac{\pi}{2}$$

or when $$\phi - \frac{\pi}{2} + \beta = n \cdot \frac{\pi}{2} \text{ with } n = \pm 1, 2, 3, \ldots \quad \text{Eq. (7)}$$

According to eqn. (7), the angle between successive zero-crossings represents the alignment angle among the cross component coils. An intuitive graphical approach can therefore be used to measure the misalignment angle between transmitter and receiver.

Alternatively, the misalignment angle can be obtained simply by using a trigonometric regression function to analyze the response of the system. Applying trigonometric identities to Eqn. (5), the response of the misaligned system can be written as $$R(\phi, \beta) = K \cdot \cos(\phi) \cdot \sin(\phi) \cdot \cos(\beta) + K \cdot \cos^2(\phi) \cdot \sin(\beta) \quad (8)$$

$$R(\phi, \beta) = K \cdot \frac{1}{2} \cdot \sin(2 \cdot \phi) \cdot \cos(\beta) + K \cdot \cos^2(\phi) \cdot \sin(\beta)$$

$$R(\phi, \beta) = \frac{K}{2} \cdot \sin(2 \cdot \phi + \beta) + \frac{K}{2} \cdot \sin(\beta)$$

The last expression in eqn. (8) indicates that a graphical representation of the coupling response of the misaligned cross component system resembles a sinusoidal function. The period of this sinusoid equals 180° and has offsets on both the abscissa and the ordinate. The offset on the abscissa is $\beta$, and the offset on the ordinate is (K/2) sin (β). Also, the coupling response is of the form A sin (x+B)+C, where A=K/2, B=β and C=(K/2)(sin (β). The coefficient B obtained with such fitting represents the misalignment angle. The cross component response can thus be fit to this curve.

Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

The following definitions are helpful in understanding the scope of the invention:

alignment: the proper positioning or state of adjustment of parts in relation to each other;
calibrate: to standardize by determining the deviation from a standard so as to ascertain the proper correction factors;
coil: one or more turns, possibly circular or cylindrical of a current-carrying conductor capable of producing, a magnetic field;
EAROM: electrically alterable ROM;
Encompass: to enclose completely
EPROM: erasable programmable ROM;
flash memory: a nonvolatile memory that is rewritable;
machine readable medium: something on which information may be stored in a form that can be understood by a computer or a processor;
misalignment: the condition of being out of line or improperly adjusted;
Optical disk: a disc shaped medium in which optical methods are used for storing and retrieving information;
Position: an act of placing or arranging; the point or area occupied by a physical object
Quadrature: 90° out of phase; and
ROM: Read-only memory.

What is claimed is:

1. An apparatus configured to evaluate an induction logging tool, the logging tool comprising:
   a source configured to activate a transmitter antenna on the induction logging tool; and
   a receiver antenna configured to produce a signal in response to the activation of the transmitter antenna;
   the apparatus comprising:
   at least one conducting loop magnetically coupled to at least one of (A) the transmitter antenna, and (B) the receiver antenna;
   wherein the signal is indicative of a misalignment angle between the transmitter antenna and the receiver antenna.

2. The apparatus of claim 1 wherein the receiver antenna is spaced actually apart from the transmitter antenna.

3. The apparatus of claim 1 wherein the at least one conducting loop comprises a single conducting loop axially encompassing the transmitter antenna and the receiver antenna.

4. The apparatus of claim 1 wherein the at least one conducting loop comprises a first conducting loop axially encompassing the transmitter antenna and a second conducting loop electrically connected to the first loop, the second conducting loop axially encompassing the receiver antenna.

5. The apparatus of claim 1 wherein the transmitter antenna has an axis that is one of (i) substantially parallel to a longitudinal axis of the logging tool, and (ii) substantially orthogonal to a longitudinal axis of the logging tool.

6. The apparatus of claim 1 wherein the receiver antenna has an axis that is one of (i) parallel to a longitudinal axis of the logging tool, and (ii) substantially orthogonal to a longitudinal axis of the logging tool.

7. The apparatus of claim 1 further comprising:
   (i) a support configured to rotate the logging tool through a plurality of angles, the transmitter being configured to be activated at each of the plurality of rotational angles, and
   (ii) a processor configured to estimate from the signals at each of the plurality of rotational angles the misalignment angle.

8. The apparatus of claim 6 wherein the processor is configured to determine the misalignment angle at least in part by using a relation of the form:

$$R(\phi, \beta) = K \cdot \cos(\phi) \cdot \cos\left(\phi - \frac{\pi}{2} + \beta\right)$$

where K is a gain factor, φ is an angle between one of the antennas and a plane defined by the at least one conducting loop, and β is the misalignment angle.

9. The apparatus of claim 6 wherein the processor is configured to determine the misalignment angle based on estimating a rotational angle at which the signal is substantially zero.

10. A method of evaluating an induction logging tool, the method comprising:
    activating a transmitter antenna on the induction logging tool;
    magnetically coupling the transmitter antenna and a receiver antenna with at least one conducting loop;
    using the receiver antenna to provide a signal in response to the activation of the transmitter antenna;
    estimating from the signal a misalignment angle between the transmitter antenna and the receiver antenna.

11. The method of claim 10 wherein the positioning of the logging tool further comprises using a single conducting loop for axially encompassing the transmitter antenna and the receiver antenna.

12. The method of claim 10 wherein the positioning of the logging tool further comprises:
    (i) using a first conducting loop for axially encompassing the transmitter antenna; and
    (ii) using a second conducting loop electrically connected to the first loop for axially encompassing the receiver antenna.

13. The method of claim 10 wherein the transmitter antenna has an axis that is one of (i) substantially parallel to a longitudinal axis of the logging tool, and (ii) substantially orthogonal to a longitudinal axis of the logging tool.

14. The method of claim 10 wherein the receiver antenna has an axis that is one of (i) substantially parallel to a longitudinal axis of the logging tool, and (ii) substantially orthogonal to a longitudinal axis of the logging tool.

15. The method of claim 10 further comprising: rotating the logging tool through a plurality of angles, the transmitter antenna being activated at each of the plurality of rotational angles, wherein
    estimating the misalignment angle further comprises using signals at each of the plurality of rotational angles.

16. The method of claim 15 wherein determining the misalignment further comprises using a relation of the form:

$$R(\phi, \beta) = K \cdot \cos(\phi) \cdot \cos\left(\phi - \frac{\pi}{2} + \beta\right)$$

where K is a gain factor, $\phi$ is an angle between one of the antenna and a plane defined by the at least one conducting loop, and $\beta$ is the misalignment angle.

17. The method of claim 15 wherein estimating the misalignment angle further comprises estimating a rotational angle at which the signal is substantially zero.

* * * * *

UNITED STATES PATENT AND TRADEMARK OFFICE
CERTIFICATE OF CORRECTION

PATENT NO. : 7,629,793 B2  
APPLICATION NO. : 11/930609  
DATED : December 8, 2009  
INVENTOR(S) : Luis M. Pelegri and Stanislav W. Forgang It is certified that error appears in the above-identified patent and that said Letters Patent is hereby corrected as shown below:

Column 9, claim 2, line 56, delete "actually", insert --axially--;

Column 9, claim 4, line 64, delete "first loop", insert --first conducting loop--;

Column 10, claim 8, line 15, delete "determine", insert --estimate--;

Column 10, claim 9, line 26, delete "claim 6", insert --claim 7--;

Column 10, claim 9, line 27, delete "determine", insert --estimate--;

Column 10, claim 11, line 41, delete "wherein the positioning of", insert --further comprising positioning--;

Column 10, claim 11, line 42, delete "further comprises";

Column 10, claim 12, line 46, delete "wherein the positioning of", insert --further comprising positioning--;

Column 10, claim 12, line 47, delete "further comprises", insert --by--;

Column 11, claim 16, line 1, delete "determining", insert --estimating--; and

Column 11, claim 16, line 2, delete "alignment", and insert --alignment angle--.

Signed and Sealed this

Second Day of February, 2010

David J. Kappos  
*Director of the United States Patent and Trademark Office*